Jan. 29, 1935.  J. C. TUTTLE  1,989,646
MOLD AND METHOD OF MAKING SAME
Filed Oct. 21, 1932   2 Sheets-Sheet 1
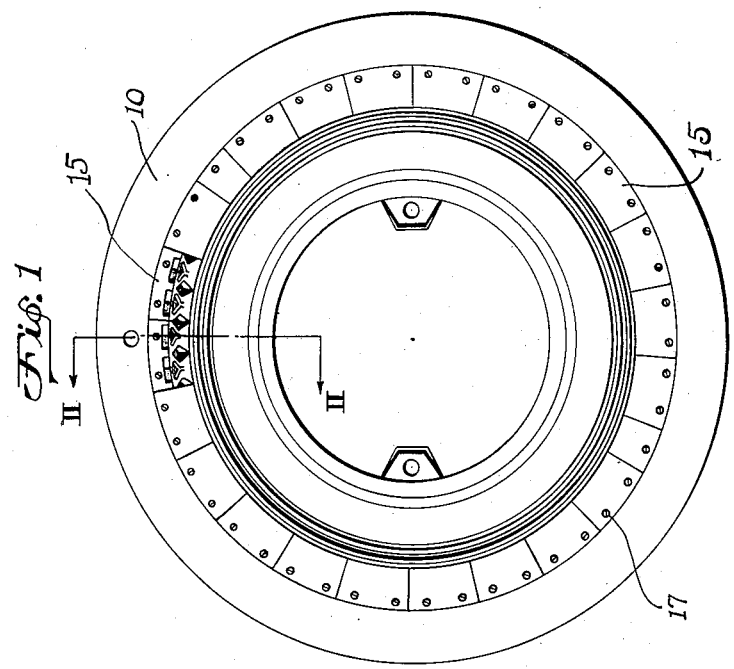
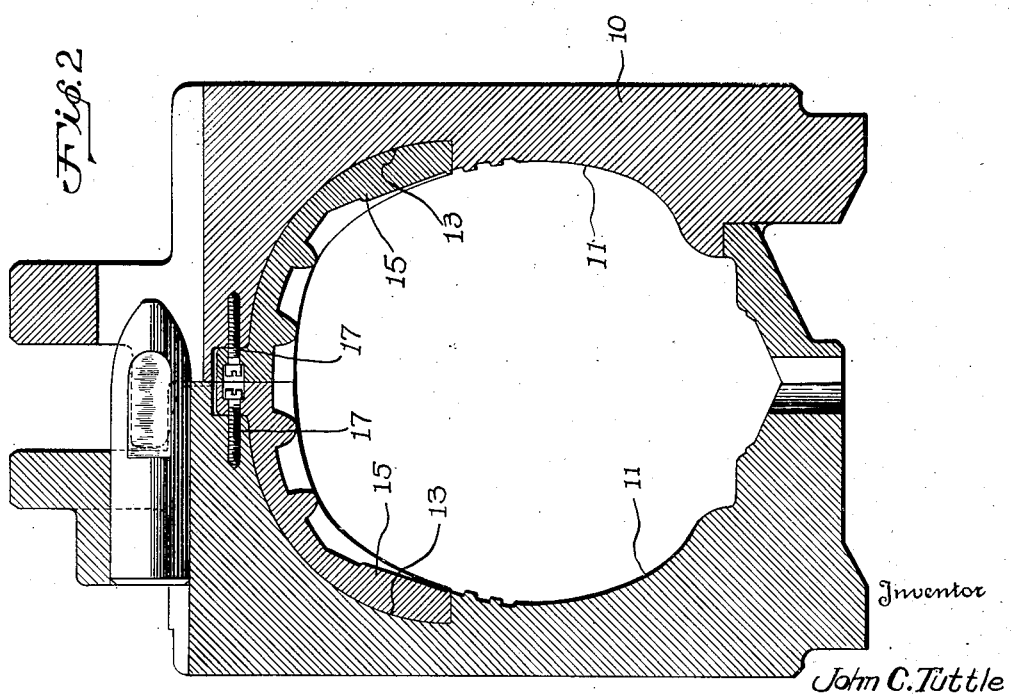
Inventor
John C. Tuttle Patented Jan. 29, 1935

1,989,646

UNITED STATES PATENT OFFICE 1,989,646

MOLD AND METHOD OF MAKING SAME

John C. Tuttle, Akron, Ohio, assignor to Wingfoot Corporation, Wilmington, Del., a corporation of Delaware Application October 21, 1932, Serial No. 638,848

9 Claims. (Cl. 18—44)

This invention pertains to molds and methods for constructing the same and more particularly is concerned with related molds of the insert type and to methods employed in their construction.

It has been the practice for years to make molds such as tire molds out of solid metal which is machined and thereafter engraved by suitable means to produce a non-skid or attractive surface configuration upon the molded tire or other article. In view of the fact that the tire designs are changed from time to time it has been necessary in the past to provide entirely new molds in substantially all cases. This mold expense has been considerable in the tire industry and the same adds materially to the cost of the molded article.

Within the last several years the solid metal mold has been replaced by the insert type mold in which a blank or base mold member is provided which receives surface inserts having the desired configuration formed thereon. With the insert type molds it has been possible to change the design or configuration produced by the mold by merely changing the inserts. It has also been cheaper to make the insert type mold when a large number of molds are neded because the expense of individually engraving each mold was eliminated by die casting the inserts. Thus the insert type mold has provided a considerable saving in the industry.

It has however been found that the best way to make up the inserts is to form them in relatively short lengths which are made by a die-casting operation, as stated above. This die-casting operation of course requires heavy and expensive dies which materially add to the cost of the mold inserts. In the tire industry it is often found desirable to produce only a comparatively small number of tires or other molded articles of a certain size. In these cases it has been found cheaper to employ solid metal molds having ordinary surface engraving rather than resort to the expense of making dies to produce the inserts for insert type molds. Again it is often necessary to produce related series of tires of slightly different sizes. In this case also it is cheaper to employ solid metal molds if the number of tires to be made is comparatively small. The manufacturer is thus unable under these conditions to advantageously employ at a saving either the solid metal mold or the insert type mold for the reasons stated above.

It is an object of the present invention to avoid and overcome the difficulties experienced by prior known types of molds and in methods of making the same by the provision of an improved type mold particularly adapted to fill a want in the field and to methods of making the same.

Another object of the invention is to provide a related series of annular molds having molding cavities of substantially the same cross-sectional dimensions but of different bead or overall diameters.

Another object of the invention is to provide an improved method for producing molds having molding cavities of related but different dimensions.

Another object of the invention is to provide annular molds of the insert type in slightly different sizes in which inserts of the same dimensions are employed.

The foregoing and other objects of the invention are achieved by the methods and molds hereafter described and illustrated in the accompanying drawings, wherein Fig. 1 is a plan view of the face of one half of an average or mean insert mold of the series embodying the invention;

Fig. 2 is an enlarged cross-sectional view taken along the line II—II of Fig. 1;

Figure 3:
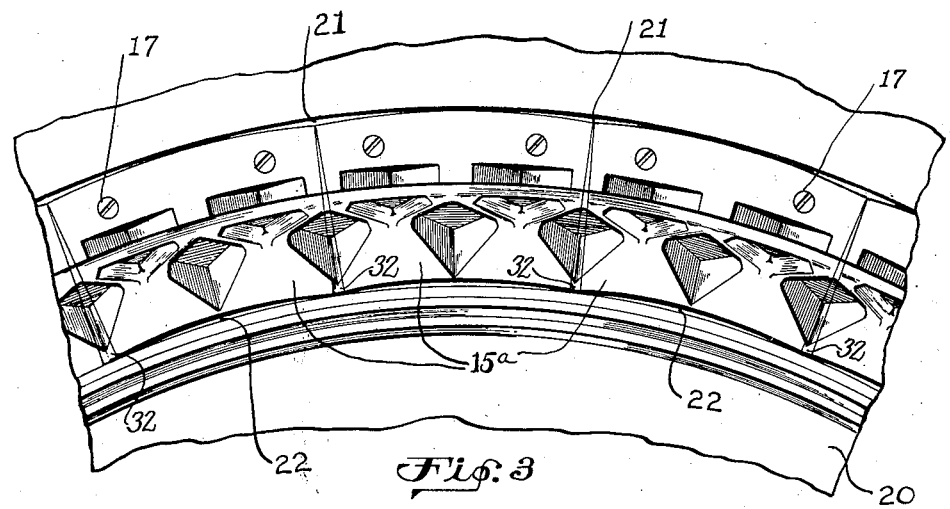
Fig. 3 is an enlarged fragmentary plan view similar to Fig. 1 illustrating another of the mold series.

The invention is ordinarily employed where it is desired to produce a related series of molds having the same design but of different sizes. This condition is experienced frequently in the tire industry and accordingly the invention has been described as applied to tire molds.

A number of blank molds of related or slightly different diametrical sizes, one of which is indicated at 10 in the drawings, are made up in which the cross-sectional dimensions of the cavities 11 are of approximately the same dimensions. The cavities 11 are of course formed to provide additional recessed cavities 13, which in the blank mold 10, are adapted to receive inserts 15 which may be held in place by any suitable means, such as screws 17. It will be understood that the shape of the cavity 11 and the recesses 13 and the particular type and shape of the inserts 15 may be widely varied without departing from the principles of the invention.

Although the cross-sectional dimensions of the molding cavities of the various related molds to be made up are ordinarily substantially the same, the diameters of the mold cavities are varied both ways from a diameter selected as the mean or average diameter. This will allow tires of several different diameters to be manufactured in the related molds. For example, tires having 16", 18" and 20" bead diameters with the 18" bead diameter tire selected as the mean or average, can be produced in the related mold series. Even a greater spread may be possible in certain cases. In the mold 10 forming the mean or average diameter tire the inserts 15 are adapted to fit perfectly. Thus the inserts are made up in dies formed to produce the inserts of a radius or curvature substantially the same as the average blank mold so that they will have the close completely contacting fit usually had between inserts and a blank mold. This relation of the inserts and mean or average blank mold is illustrated in Figure 1 of the drawings.

However, in another mold of the related series, when the standard size inserts 15ª are secured in a blank mold 20 having a molding cavity of substantially the same cross-sectional dimensions but of a greater overall diameter, the inserts have the relation with the mold illustrated in Figure 3. It will be seen that the number of inserts which will have to be employed is greater than the number necessitated in the mean or average mold shown in Figure 1. This means that the curvature or radius of the inserts will be sharper than the curvature of the machined cavity in blank mold 20, as seen in the drawings Fig. 3.

There will accordingly be a very small space 21 left between the outer or circumferential sides of the ends of the individual inserts and the circular shoulder forming the outer boundary of the recess in the blank mold 20. In Fig. 3 this space 21 has been accentuated so as to be visible in the drawings. However, in actual practice the space is so small as to be disregarded and it causes no imperfections in the molded article because the same is not in the molding cavity. There will also be a slight gap 22 between the central inner portion of the inserts 15ª and the inner shoulder of the recess formed in the blank mold 20, which space has also been exaggerated in Fig. 3 of the drawings. A very slight space 31, which has been exaggerated on the drawings will occur between the ends of the individual inserts. These slight gaps and spaces are so small that they may ordinarily be ignored without noticeable effect on the molded article. As a matter of fact in use they soon fill up with soapstone or mold lubricant to present a smooth molding surface.

Although it is the purpose of the invention to avoid expense and labor in preparing related molds using identical inserts, it will be understood that in certain instances, for example where there is considerable change in dimensions between the average mold and the related molds, it may be necessary or desirable to machine the ends and the inner circumferential portions of the inserts to assist in obtaining a better fit between the inserts and the blank mold. In this connection it is to be noted that the ends of the inserts are ordinarily machined in all cases even for the average or mean blank mold.

The inserts 15ª are held in the blank mold 20 by means similar to those employed in conjunction with the average or mean mold illustrated in Figs. 1 and 2 and described above. The inserts and blank mold 20 are finished and polished in the usual manner as is well known in the case of ordinary insert type molds.

Figure 4:
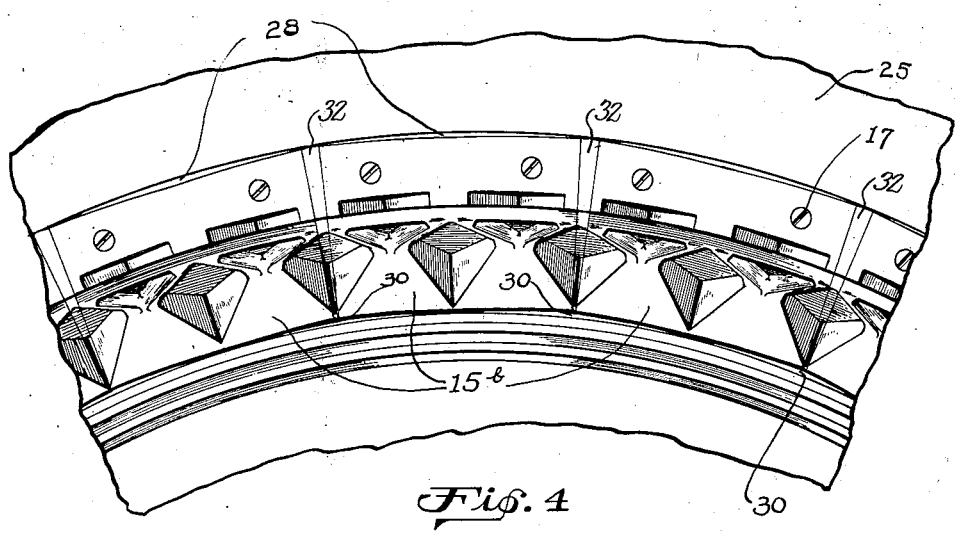
Fig. 4 is a figure similar to Fig. 3 illustrating another of the mold series and the manner in which the inserts are employed.

Referring now to Fig. 4 of the drawings, which illustrates a third of the related mold series, the numeral 15ᵇ indicates the standard size inserts which are employed in conjunction with a blank mold 25 which has a molding cavity of smaller diameter than that of the mean or average blank mold illustrated in Figs. 1 and 2. The inserts 15ᵇ fit down into the appropriately recessed cavity formed in the blank mold 25 in the manner illustrated in Fig. 4. The inserts 15ᵇ are held in the blank mold 25 in any suitable manner, such as for example that described above in conjunction with Figs. 1 and 2.

It will be seen that the curvature or radius of the insert 15ᵇ is greater than the curvature or radius of the recess portion in the blank mold 25 so that the outer sides of the ends of the inserts contact with the outer circumferential shoulder forming the recess in the blank mold 25, so as to leave a slight space centrally of the inserts which has been indicated by the numeral 28. This space is exaggerated in the drawings but in actual practice does not affect the molded article because it is not in the molding cavity. It will also be noticed that the inside portions of the inserts 15ᵇ contact with the inner shoulder of the recess in the blank mold 25 at central positions and that therefore spaces, indicated at 30, are formed in the mold. These spaces do not cause molding difficulties where the related size of the blank mold 25 and that selected as the mean or average diameter mold do not vary too greatly. In addition they fill up in use as stated above with respect to the mold shown in Fig. 3. However, where the change in dimensions between the related molds is considerable, it is the best practice to machine the inner curvature of the inserts so that they more nearly coincide with the particular blank mold. Thus the spaces 30 will be obliterated as will any molding difficulties engendered thereby.

It is also to be noted that there will be slight spaces 32, which are exaggerated on the drawings, formed between the ends or sides of the inserts where they contact one another. However, these spaces are not ordinarily of such size as to cause markings upon the molded article. It is, however, contemplated, as stated above with respect to Fig. 3, to machine the inserts to render the various spaces less noticeable or to completely obliterate the same. The ends of the inserts are ordinarily machined in all related mold sizes to insure a better circumferential fit thereof.

The inserts 15, 15ª and 15ᵇ are of sufficient size and thickness to insure that there will be no bowing or bulging of the same in the blank molds 20 and 25 where the inserts are not completely supported.

While the invention has been described above and illustrated in the accompanying drawings as comprising a related set of three molds, namely the mean or average diameter mold, the mold slightly larger than the average or mean diameter mold, and the mold slightly smaller than the average mold, it will be evident that the invention contemplates making any number of related molds as long as the difference in dimensions from the mean or average mold is not too great which would destroy the feasibility of the present invention. In this connection it will be understood that the change in mold sizes used in the tire industry will be dependent upon and controlled by the change in standard rim diameters and tire sizes.

The inserts are ordinarily made up in comparatively short lengths so that a relatively large number of the inserts must be employed in each insert type mold. The greater the number of inserts the more truly circular will be the molded article formed in the related molds. This is because the molded article formed in the related molds other than the average diameter mold will not be a perfect circle, but will actually be formed in a polygonal shape in which the number of arcuate sides will comprise the number of inserts employed in the mold. Suffice it to say that the number of inserts should be kept comparatively high if the related molds are to produce articles in which the slight out of roundness is not to be noticed. It has been found, however, that in actual practice the slight imperfections created by molding the articles in related molds produced in accordance with the present invention has not been noticeable and that the articles produced, such as tires, will function in the usual manner without possessing characteristics which are undesirable.

While the invention has been described as being employed in conjunction with blank molds having cavities in which the cross-sectional diameters are kept constant with changes in the overall diameters, it will be understood that slight variations in cross-sectional diameters can also be made, as well as variations in the overall and bead diameters, and that the principles of the present invention can be employed to produce related molds of these and other varying characteristics.

In the ordinary practice of the invention the inserts are made up so that the design is repeated one or more times or pitches thereon. Thus the related molds and the inserts can be of such comparative size that one or more complete inserts or pitches thereof are removed from or added to the number of inserts employed in the molds of mean or average diameter when making related molds of smaller or larger sizes. Thus any necessity of splitting one insert into any proportionate part greater or less than one pitch is eliminated. The operation of building the related sized molds is thereby facilitated, as is the matching up of the inserts in the different sized molds.

From the foregoing it will be seen that an improved process has been provided for producing annular molds of related sizes which process is particularly adapted for the tire industry. It is possible to produce molds of slightly different sizes by a comparatively inexpensive operation which fulfills a long felt want in the industry.

While the invention has been particularly described in conjunction with tire molds it will be appreciated that the features thereof are applicable to the production of molds for any articles in which related sizes are required. It will also be appreciated that the principles of the invention can be employed in the construction of any circular or arcuate molds of the insert type and that, moreover, the invention broadly contemplates the production of molds of all characters.

In accordance with the patent statutes one form of applicant's invention has been particularly described and illustrated. However, this is to be taken as an example and not a limitation in that the scope of the present invention is defined in the appended claims.

What I claim is:

1. A related series of molds comprising a plurality of blank molds of different dimensions including a blank mold of mean or average dimensions, mold facing inserts of a standard size in the average size mold and adapted to fit therein, and inserts of the same standard size in the other blank molds, the number of inserts being greater in the blank molds larger than the average blank mold, and the number being smaller in the blank molds of lesser dimensions than the average blank mold.

2. A related series of molds comprising a plurality of blank molds of different dimensions including a blank mold of mean or average dimensions, mold facing inserts of a standard size in the average size mold and adapted to fit therein, and inserts of the same standard size in the other blank molds.

3. A series of molds for tires of the same cross-sectional dimensions but of different overall diameters including a plurality of blank molds having cavities of the same cross-sectional dimensions but of different diameters, standard size inserts adapted to fit into the cavity of a blank mold of mean or average size, said inserts having the same radius of curvature both circumferentially and transversely as the average blank molds, and inserts of substantially the same standard size secured in the cavities of the blank molds smaller and larger than the average blank whereby a series of insert type molds of related sizes is produced.

4. A series of molds for tires of different bead diameters including a plurality of blank molds having cavities of different diameters, inserts adapted to fit into the cavity of a blank mold of mean or average size, said inserts having the same radius of curvature both circumferentially and transversely as the average blank mold, and inserts of the same circumferential and transverse curvature secured in the cavities of the blank molds smaller and larger than the average blank whereby a series of insert type molds of related sizes is produced.

5. A series of molds for annular articles of different overall diameters including a plurality of blank molds having cavities of different diameters, standard size inserts adapted to fit into the cavity of a blank mold of mean or average size, said inserts having the same radius of curvature, both circumferentially and transversely as the average blank mold, and inserts of the same standard size secured in the cavities of the blank molds smaller and larger than the average blank mold.

6. Related tire molds of the insert type comprising blank molds of different molding dimensions, and a plurality of die cast inserts secured in said molds, said inserts being of substantially the same dimensions.

7. The method of making a related series of tire molds comprising forming blank molds having cavities of different sizes, die casting a plurality of facing inserts of a common size, providing recesses in the molding cavities of the various sized molds, and securing the same sized inserts in the recesses of the molding cavities of all the molds.

8. The method of making a related series of tire molds comprising forming blank molds having cavities of different sizes, selecting a mold of mean or average size, die casting a plurality of facing inserts of a common size adapted to fit in the blank mold selected as the mean, providing recesses in the molding cavities of the various sized molds, and securing the same sized inserts in the recesses of the molding cavities of all the molds.

9. The method of making a related series of annular molds comprising forming blank molds having cavities of different sizes, selecting a mold of mean or average size, die casting a plurality of facing inserts of a common size adapted to fit in the blank mold selected as the mean, and securing the same sized inserts in the molding cavities of all the molds.

JOHN C. TUTTLE